United States Patent
Ganesan et al.

(10) Patent No.: US 9,043,328 B2
(45) Date of Patent: May 26, 2015

(54) CONFIGURABLE CATALOG BUILDER SYSTEM

(75) Inventors: Ashok Kumar Ganesan, Chennai (IN); Ruby Felicia Noel, Channai (IN); Adarsh Kumar Jhunjhunwala, Chennai (IN); Lokesh Sikharam, Chennai (IN); Prabhu Arumugham, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 303 days.

(21) Appl. No.: 13/153,133

(22) Filed: Jun. 3, 2011

(65) Prior Publication Data

US 2012/0173501 A1    Jul. 5, 2012

(30) Foreign Application Priority Data

Dec. 30, 2010    (IN) .......................... 3582/MUM/2010

(51) Int. Cl.
*G06F 17/30* (2006.01)
*G06Q 30/06* (2012.01)

(52) U.S. Cl.
CPC .................................. *G06Q 30/0603* (2013.01)

(58) Field of Classification Search
None
See application file for complete search history.

(56) References Cited

U.S. PATENT DOCUMENTS

| | | | | |
|---|---|---|---|---|
| 5,880,720 A * | 3/1999 | Iwafune et al. | ................. | 725/24 |
| 5,940,769 A * | 8/1999 | Nakajima et al. | ............. | 455/509 |
| 6,012,053 A * | 1/2000 | Pant et al. | ............................ | 1/1 |
| 7,904,348 B2 * | 3/2011 | Johnson et al. | ............. | 705/27.2 |
| 8,161,044 B2 * | 4/2012 | Blackwell et al. | ............ | 707/731 |
| 2001/0044837 A1 * | 11/2001 | Talib et al. | .................... | 709/219 |
| 2003/0028451 A1 * | 2/2003 | Ananian | ......................... | 705/27 |
| 2006/0236216 A1 * | 10/2006 | Blackwell | ..................... | 715/500 |
| 2009/0172773 A1 * | 7/2009 | Moore | ............................ | 726/1 |
| 2010/0251151 A1 * | 9/2010 | Alsbury et al. | ............... | 715/765 |

* cited by examiner

*Primary Examiner* — Sangwoo Ahn
(74) *Attorney, Agent, or Firm* — Schmeiser, Olsen & Watts LLP (57) ABSTRACT

A catalog builder is disclosed. This invention relates to data management systems, and more particularly to catalog creation mechanisms in data management systems. Present day data management systems employ catalog builder tools. However, the catalog builders cannot be configured as per the requirements of the users. Further, there are no mechanism to configure custom catalogs and associated metadata. The disclosed catalog builder may be employed to configure an online central repository on the fly and build a catalog. The catalog builder is equipped with a central repository. Further, catalog builder is also provided with advanced search features and analytical capabilities in order to search for the data specified by the user and fetch the data from the central repository. The catalog builder is also provided with clustering and segmentation capabilities in order to slice and dice the data.

12 Claims, 5 Drawing Sheets

CONFIGURABLE CATALOG BUILDER SYSTEM

CROSS REFERENCE TO RELATED APPLICATION[S]

This application claims priority to Indian Patent Application to Ganesan et al., serial number 3582/MUM/2010, filed Dec. 30, 2010, the disclosure of which is hereby incorporated entirely herein by reference.

FIELD OF INVENTION

This invention relates to data management systems, and more particularly to a user defined dynamic catalog creation mechanisms in data management systems.

BACKGROUND OF INVENTION

Information and data management systems have been employed in large organizations to effectively maintain data within an organization. Further, data is an asset for organizations and hence it is very important that maintained data is well organized and secured. Presently, organizations manage various kinds of information. Most of the information is primarily related to core businesses and are stored and managed in Enterprise systems, ERPs like SAP, Oracle Apps or Peoplesoft. However, there is a large set of information maintained in adhoc or semi-structured manner that cannot be stored in enterprise systems. Information like Application Inventory, Open Source Software Inventory, Software Asset Inventory, Process Inventory, Known Error Inventory etc., are not stored in any enterprise system.

Existing approach of solving the problem is to only create a custom repository for storing such information.

Present day organizations are distributed in nature. The organizations usually operate out of multiple departments and offices that are geographically distributed. Further, the data that is maintained within such an organization is also distributed across various departments, business units and facilities. The data management systems employed in such organizations manage information that is present locally within the departments, business units and so on within the organization. Further, existing systems do not provide any means to configure the data that is maintained within the organization. Due to this drawback, every time a user wants some information from the system he needs to build a custom solution each time for his requirement as there is no provision for configuring the data. The organizations are is compelled to create a central repository to store the information from different departments, business units and so on at one of the locations so as to suit its operational requirements. This process of customizing the solution is time consuming and cumbersome.

The search mechanisms offered by these systems are not precise due to unorganized and unrelated state of information, hence cumbersome and increases search time of users. Moreover, these systems generally follow directory based approach and do not facilitate the keyword based search to retrieve the relevant data required by the user. Further, there are no analytics in the data captured by such legacy search tools. As a result, there may be a lot of repeated work and wastage of effort of the user in conducting the search. Further, these systems have poor reporting features wherein the searched data cannot be exported to a user desired format. Also, existing search mechanisms do not provide options to the user to drill down or browse through the search results. Due to the aforementioned drawbacks, the data access process becomes time consuming and cumbersome.

Systems that can create data catalogs do not provide the feature to configure the created data catalogs and customize the same as per the requirements of the user. Customization of data catalogs, in absence of ready to use feature, consumes a lot of time and resources. In addition, the Metadata associated with the catalog cannot be customized to create custom attributes for the entity to be stored in the catalog. Moreover, it is practically not possible to create multiple catalogs for different entities and subsequently to establish multiple associations there between the entities across the organization.

Further, the existing cataloguing systems do not offer a flexibility to slice and dice the data as per the requirements of the user. In addition, these systems do not provide the option of clustering and segmenting the data in order to perform data analysis in a strategic manner. The existing cataloguing systems lack the ability to incorporate new attributes of applications, which are required for carrying out detailed portfolio analysis of the data and are unable to adapt to the updates made on the data structure of the catalog. Also, addition of new attributes by the architects and service managers at any point of time is not possible in the existing systems. Hence, when a new application is to be developed, the user cannot employ the stored data and modify the same to suit his/her requirements. In absence of a feature for data analysis and exploitation, the user needs to write codes and develop tool from the scratch for gaining a limited configurability of the system. Thus, existing cataloguing systems, seldom encourages users to use pre-available features to exploit data and instead necessitate user to develop personalized tools which is monetarily taxing and time consuming.

Due to the aforementioned drawbacks it is evident that existing data management systems and catalog builder tools are not effective due to high cost, lack of user friendliness and flexibility of operations.

OBJECT OF INVENTION

The principal object of this invention is to devise a catalog builder offering complete configuration capabilities to the user for customizing the system to suit variety of scenarios, operational demand and exigencies in an organization.

Another object of the invention is to provide a system with ability to configure Metadata with attribute creation feature.

Yet another object of the invention is to provide a system with keyword based searchability, reporting and analytical capabilities to the catalog.

SUMMARY OF THE INVENTION

Accordingly, the invention provides a system for creating catalog applications. The system is comprising means adapted for enabling plurality of users to configure a catalog builder to create plurality of catalogs for their applications by employing a user terminal, storing the user configured details on a central repository, configuring plurality of entities as per the user requirements in the catalog on receiving a request from the user and sending the configured entities from the catalog to the user in user desired format.

Also provided is a configuration console in a catalog builder. The console is adapted with a means for enabling plurality of users to configure at least one catalog according to the requirements of their applications through a user terminal, the console sending the configured information to a central repository for storing the information.

There is also provided a method for creating catalog applications. The method is comprising steps of enabling plurality of users to configure a catalog builder to create plurality of catalogs for their applications by employing a user terminal, storing the user configured details on a central repository by the catalog builder, configuring plurality of entities as per the user requirements in the catalog on receiving a request from the user and sending the configured entities from the catalog to the user in user desired format.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a configurable catalog builder system by providing a method for creating and maintaining a catalog for the data. Referring now to the drawings, and more particularly to FIGS. 1 through 5, where similar reference characters denote corresponding features consistently throughout the figures, there are shown preferred embodiments.

A configurable catalog builder system is disclosed. The catalog builder may be employed to configure an online central repository on the fly and build a catalog. The catalog builder creates a catalog for any type of data that is employed within an organization. The data may include program codes, software's, inventory data, vendor data, process data, sales data, project data, known error data, employee data, activity log, product details, item data and any other information that is stored in an organization.

The catalog builder is equipped with a central repository, which enables the catalog builder in order to store and configure data available at different locations and different fields on the fly. Further, the catalog builder is also provided with advanced search features and analytical capabilities in order to search for the data specified by the user and fetch the data from the central repository.

Some example usages include the catalog builder being configured as a process repository, software or hardware repository or vendor repository. As a process repository, the catalog builder may store and fetch the details of different fields on the processes carried out within an organization. As a repository for both software and hardware, details on the software developed for different applications may be stored and obtained when required. In addition, any hardware design and implementation details may also be stored. As a vendor repository, details on products developed for every vendor, codes written for the development of those products and the like may be stored. All this information is stored and maintained on the central repository. The catalog builder is further provided with the capability to customize the data stored on different entities across different departments within the central repository and fetch data required from the central repository as per the user's requirements.

On the central repository, the data is maintained in a well organized format in the form of data structures. Further, the catalog builder is designed to provide the user the capability to configure one or more custom catalogs and associated metadata. The work flow process and security rules for the catalog builder may also be configured by the user. The catalog builder is also provided with data comparing and reporting features. The data comparison compares the data and fetches the data from the central repository as per the requirements of the user. The reporting feature helps to create reports on the configured catalogs. The catalog builder also allows the user to obtain the data in a format preferred by the user. As a result, the user is able to access any information or data available across different entities within the organization at any instance of time.

Figure 1:
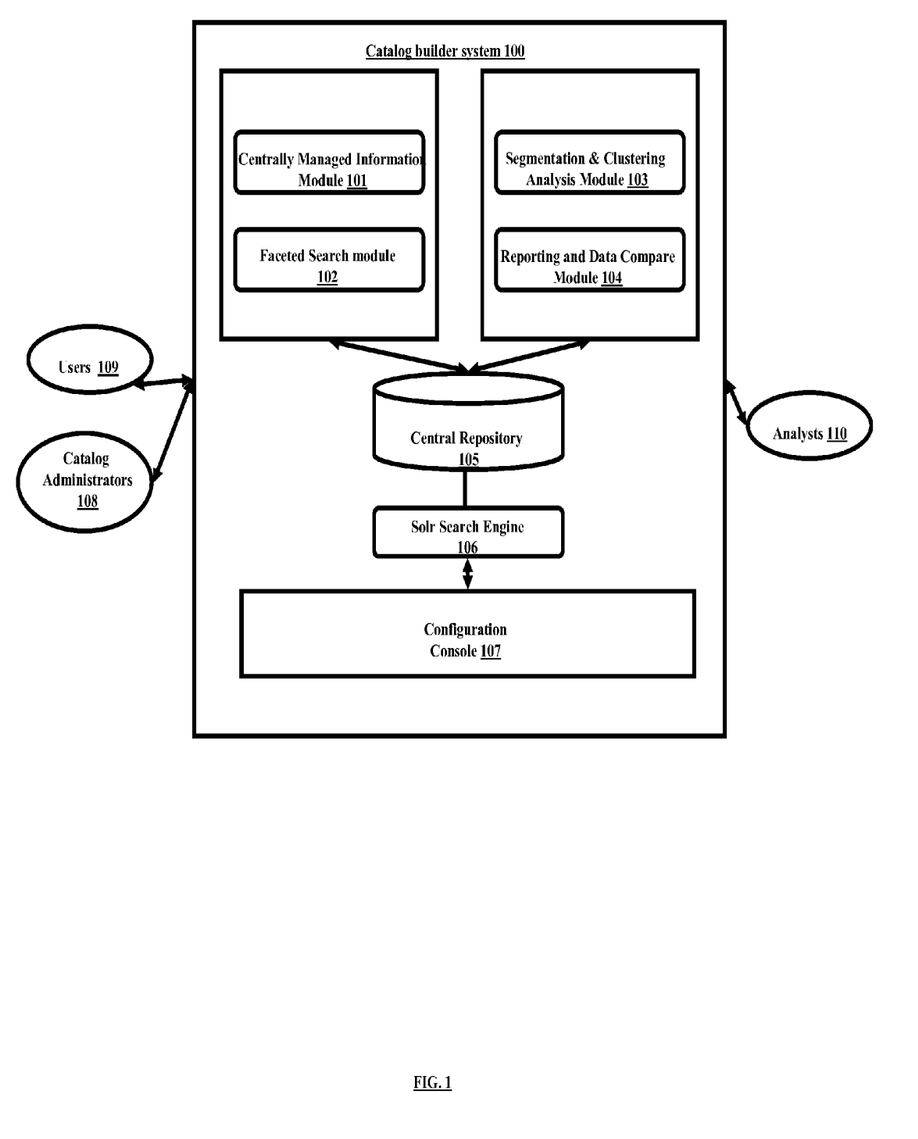
FIG. 1 depicts a catalog builder system, according to embodiments as disclosed herein.

FIG. 1 depicts catalog builder system, according to embodiments as disclosed herein. As depicted, the catalog builder system 100 comprises of different sub modules that assist in the functioning of the catalog builder system 100. The sub modules comprise of a centrally managed information module 101, a faceted search module 102, segmentation and clustering analysis module 103, a reporting and data compare module 104, a central repository 105, a Solr search engine 106 and a configuration console 107. In addition, the catalog builder system 100 comprises of catalog administrators 108, Users 109 and Analysts 110 who fetch the data or upload any data to the central repository 105 through the catalog builder system 100.

The catalog administrators 108 employ the configuration console to create multiple catalogs, to configure reports, configure search parameters and so on. The catalog administrators 108 also perform settings on the catalog builder tool. The settings include defining if a created entity is to show up in the search results, the fields within an entity that is to show up in the search results and so on. In addition, the catalog administrators 108 may also restrict the users who access the data from the catalog builder, may define the fields that may be accessed by the users.

Users 109 may include any person who accesses the catalog builder to update or insert data in any form. Users 109 employ the catalog builder to maintain the data and centrally manage information. The users 109 may also search through the created catalogs and use the information from the catalog whenever required to manage their operations. The users 109 perform operations such as search, upload and the like on the catalog builder 100 in order to extract desired data.

Analysts 110 may employ the catalog builder system 100 in order to make reports. Analysts 110 may use the analytical features on the catalog builder system 100 to analyze information and take critical decisions. In addition to the above mentioned actions, the analysts 110 may also perform segmentation and clustering on the data when required in order to get desired information.

The catalog administrators 108, users 109 and analysts 110 may access the catalog builder system 100 using a suitable user terminal like a computer, a hand held device and so on.

When the user 109 employs the catalog builder system 100, he is directed towards a configuration console 107. On the configuration console 107 the user 109 may be provided options in order to configure the catalog builder system 100 as per his requirements. On configuration, the details may be stored on the central repository 105. When desired the user 109 may enter his search query on a search submit form that is presented to him. The search query is then sent to the Solr search engine 106, where the data is analyzed. Then the data requested by the query is fetched from the central repository 105. The fetched data is then presented to the user in a format as configured by the user.

The managers centrally manage the information with the help of catalog builder features. The users 109 also employ features such as upload, online/batch download, search and the like that is offered by the catalog builder to manage the information centrally.

The faceted search module 102 enables the user to easily access the data that he is looking for in the central repository 105 by enabling the user to perform a faceted search on the catalog builder 100. The faceted search module 102 analyzes the text entered by the user for any data that is required by the user. The faceted search module 102 employs entity extraction techniques which comprises of keyword based search combined with navigational capabilities to extract the data requested by the user. In another embodiment, the faceted search module 102 may also use pre-existing fields configured in the central repository 105 for example author, descriptor, language, and format in order to extract the data requested by the user. This approach also permits existing web-pages, to have some metadata/fields extracted and presented as a navigation facet to the user to enable them navigate through or drill down results. For example, once extracted results based on author are presented—Language as a Facet is shown showing 3 results in English and 2 results in Spanish, on clicking the "English" value in the Language facet, the results will be drilled down to show only results from English language.

The segmentation and clustering analysis module 103 performs segmentation of the data requested by the user if required. There may be instances where a user may request or search for a part of the data that is used for an application for example, the user may want modules of a code written for an application; for example, macros, primary keys, global variables. In such cases, there may be a need to segment the data stored on the central repository 105 and fetch the appropriate portions of the content requested by the user. The data may be fetched from different fields stored within the entities on the central repository 105. In addition, module 103 also performs clustering of data. The user's request may require clustering the data for example, for a database of employees, the user may require a cluster that comprises of dept_manager and so on. Or in another instance, the user may wish to cluster parts of data available on the central repository 105 and use the clustered data on the fly. The functions as described above may be performed by the segmentation and clustering analysis module 103.

The reporting and data compare module 104 provides reporting and data compare features to the catalog builder 100. The reporting and data compare module 104 aids in clustering and segmentation analysis on the created data catalog. The reporting component has an integrated reporting engine that enables users to create reports on the configured catalogs. The data compare component performs data comparison. The data compare enables the user in order to perform a comparison to the lowest level that aids in better data analysis.

The central repository 105 maintains all the data and information related to the organization on it. By storing the data on a central location, the central repository 105 makes management of data and information easy and the data visibility to the user becomes easy. Any metadata, attribute required by the user may be fetched easily across different entities from the central repository 105 by performing a simple search.

The Solr search engine 106 is an open source search engine that is employed within the catalog builder 100 in order to aid the user for performing searches. The search engine 106 provides keyword based search along with navigation search features to the user. By employing the Solr search engine, the user may customize his search requirements. For example, the user may specify that a search be conducted in a particular metadata in the catalogs. Further, the user may also choose to define multiple metadata in which the search keyword has to be looked for and the like. In addition, the user may also define a priority order for the search. For example, on creation of an Application Catalog with application details like application name, description and so on, the user may define to conduct the search on application name. The user may also specify the application name as highest priority. In that case, the search will be conducted and results with matching application names are assigned highest priority.

The configuration console 107 may be employed in order to configure the catalog builder as per the user's requirements. Using the configuration console 107, the user may configure core entities and attributes of the data structure, define process flows and manage faceted search feature. In addition, the configuration console 107 may also provide security to the system by providing authenticated access to the data on the central repository 105.

Figure 2:
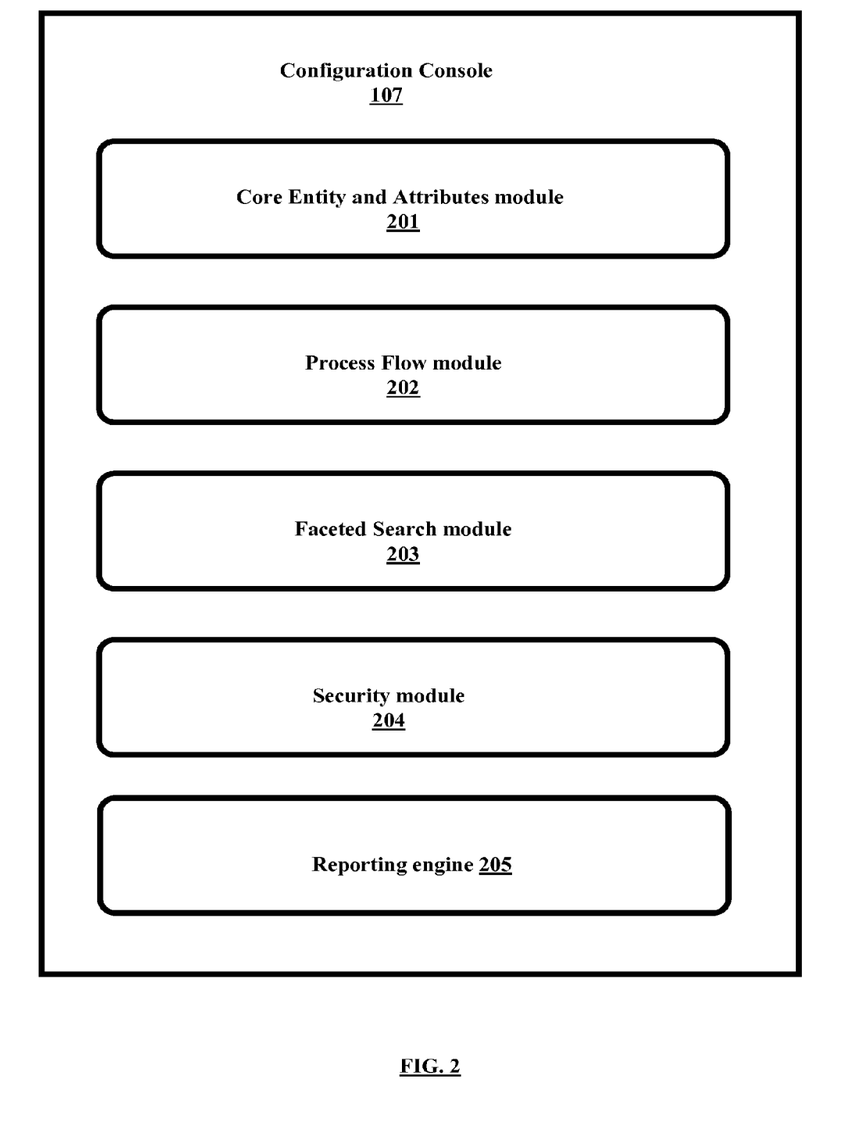
FIG. 2 illustrates a configuration console, according to embodiments as disclosed herein.

FIG. 2 illustrates a configuration console, according to embodiments as disclosed herein. The configuration console 107 provides the option to the user in order to configure various entities of the data structure stored on the central repository 105. The user is provided flexibility to configure core entities by employing a core entity and attributes configuration module 201, process flows module 202, faceted search module 203, a security search module 204 and a reporting engine 205.

Employing the core entity and attributes configuration module 201, the user may configure the entities of the metadata, attributes that is required by his application, name of the entity, if the entity is mandatory, unique, primary key and the like. Further, the configurations may be defined by the user through a user interface. The configuration may be performed on the fly. Also, no additional codes need to be written. Configuration is generally performed by the catalog administrators 108. If required, the user 109 may also configure the catalog details as per his requirements.

Once the data is configured, the user may employ process flow module 202 in order to define the sequence of the work flow involved in a process. The process flow module 202 may be employed by the user to define the transactions that are to be carried out on the configured data. The process may be any flow the submitted data should take. For example, once data is submitted, if it has to be taken through a 2-3 step review process before it moves to the "published" state, this process flow can be configured into the system.

The faceted search module 203 may be configured by the user in order to simplify the searching process. Faceted search module 203 may be configured to analyze the text entered by the user for any data that is required by the user. Faceted search helps to narrow down the search results, browse through the search results using the facets. In an example, when looking for a specific application in the catalog the user is provided with a faceted view of the applications on the search page. Using this user may just click on the specific application of interest from one geography. This feature helps to narrow down the search.

Security module 204 of the catalog builder 100 may also be configured by the user. The user may at the time of configuration define the authorized persons who access the data.

Also, restrictions may be imposed in terms of the content that is allowed to be viewed. For example, to achieve high levels of security 'submit', 'edit' and 'view' options may be provided restricted access. In this way only authorized persons will be able to use the password and access the secured data. In addition, the user may also define some security rules if required to achieve high levels of security to any confidential data stored on the central repository 105.

The reporting engine 205 helps the user to configure the reports as desired by him to assist in the analysis of the data. Reporting engine 205 enables the user to configure reporting solution on top of the data existing in the repository with option to build standard types of reports like bar charts, pie charts, stacked pie charts, line graphs. The reports also have charts built in with option to download to excel and PDF.

Figure 3:
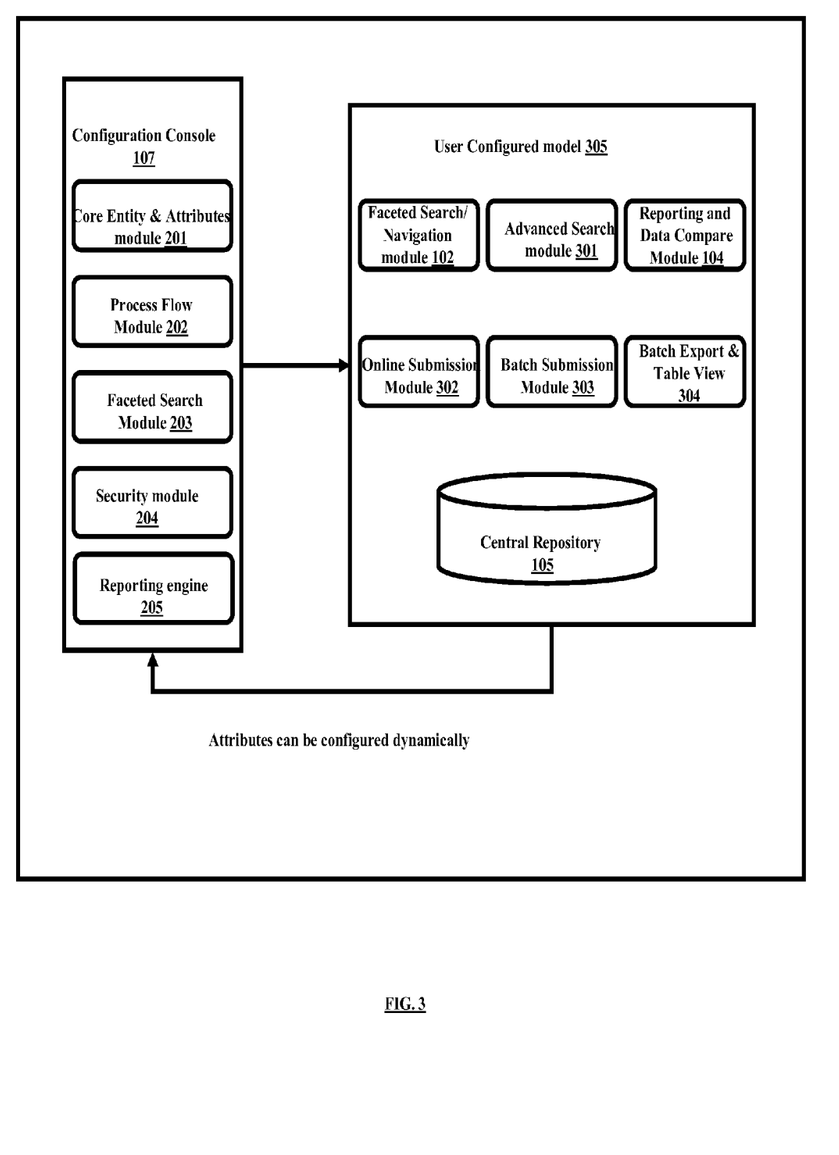
FIG. 3 illustrates the architecture of the catalog builder system, according to embodiments as disclosed herein.

FIG. 3 illustrates the architecture of the catalog builder system, according to embodiments as disclosed herein. At the starting of the process, the user configures the configuration console 107. The configuration as configured by the user is then verified to ensure that the configurations are acceptable within the system specifications. The verified model is then approved and a user configured model 305 is set up. Further, if any changes are made on the user configuration model 305, the changes may be reflected on the configuration console 107 and the process thus continues. The user performs configuration of various metadata attributes, entities and so on using the configuration console 107. The configuration console 107 is then updated by updating its modules. The modules include core entity and attributes module 201, wherein the entities and the attributes that are configured by the user are updated. The process flow module 202 where the order of the process to be performed is stored. The order is maintained as defined by the user during configuration. The faceted search module 203 wherein the faceted configurations as specified by the user are stored. The security module 204 wherein the user may be provided with the option of providing restricted access to the data on the catalog builder 100 by including authentication features.

The reporting engine 205 helps the user to configure the reports as desired by him to assist in the analysis of the data. Reporting engine 205 enables the user to configure reporting solutions on top of the data existing in the repository with option to build standard types of reports like bar charts, pie charts, stacked pie charts, line graphs. The reports also have charts built in with option to download to excel and PDF. The details configured by the user are employed to build a configuration model repository. The built model repository is then verified. On approval, a user configured model 305 is built. The user configured model 306 comprises of different sub modules that store the configuration details specified by the user and accordingly build a model for the user. Different attributes of the data may be configured dynamically by the user.

The faceted search/navigation module 102 is employed by the user in order to configure search features on the catalog builder 100. The user may prefer to conduct a faceted search on the data and hence he may choose to configure the faceted search module 102. The faceted search module 102 may also provides navigation options to the user in the search display page. The navigation tool bar may direct the user to the desired section. Faceted search helps to narrow down the search results, browse through the search results using the facets. In an example, when looking for a specific application in the catalog the user is provided with a faceted view of the applications on the search page. Using this user may just click on the specific application of interest from one geography. This feature helps to narrow down the search. The advanced search module 301 may provide options to the user in order to perform advanced searches and extract results as per his requirements. In an example, the user may choose to restrict fields in the search such as search may be limited to the contents of the application name or application technology. In that case, the catalog builder's search engine 106 will look for the search keyword in the fields (i.e., application name and application technology) of the catalog.

The reporting and data compare module 104 performs data comparison and reporting functions. The system is provided with an integrated reporting engine that enables the users in order to create reports on the configured catalogs.

Online submission module 302 provides a generic form designer capability, to the catalog builder by designing a 'Submit' form to capture the real-time information of the entities to be stored. While creating entities and attributes a form is designed to collect the data. This form created during run time will be used for online submission for data input.

The batch submission 303 enables the user in order to submit data in batches. The submitted batch may include updated data in the repository. The catalog builder 100 also allows the user in order to update his data on to the central repository 105.

The batch export and table view 304 enables the user in order to extract the requested data from the central repository 105. The data may be extracted batch wise into an excel sheet. In an embodiment, the data may be extracted in any other form such as a word, PDF and the like.

The central repository 105 is the final repository that stores all the data as per the requirements of the user. In an embodiment, at any point of time the central repository 105 may be modified as per the changes made by the user.

Figure 4:
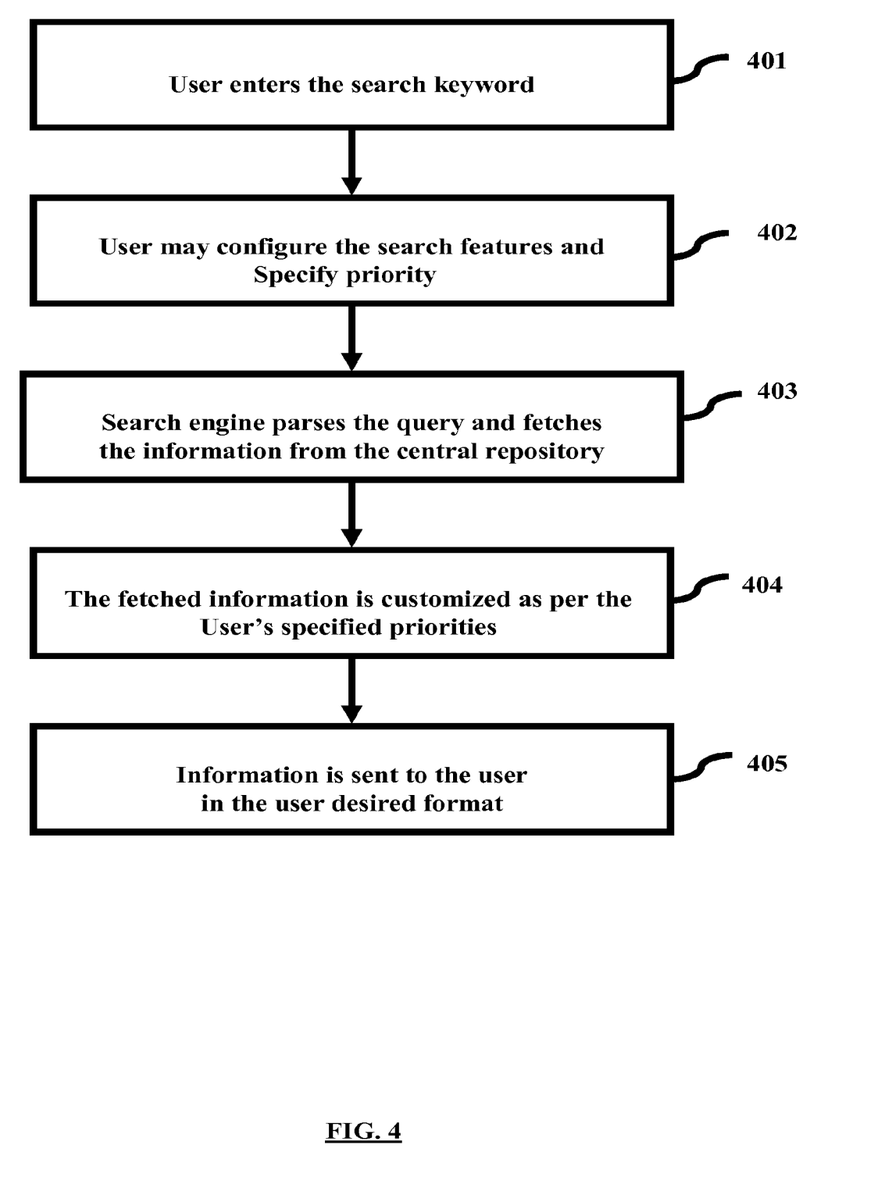
FIG. 4 is a flow chart depicting the process of performing a search within the catalog builder, according to embodiments as disclosed herein.

FIG. 4 is a flow chart depicting the process of performing a search within the catalog builder, according to embodiments as disclosed herein. An end user who employs the catalog builder 100 may want to use the catalog builder in order to search for some data stored on the central repository 105. While creating attributes the catalog administrator will have defined the attributes that show up during the search and the attributes that are searchable. Also the administrator can define a priority for the attribute. While a user requires searching for information he enters (401) his search "Keyword" in the search field. In an example, the user may want to search for the application "App A" where attribute 'application name' is a searchable field in a repository of applications. In such a case, the user will input a keyword as 'App A'.... The Solr search engine parses (403) the query. On parsing the query the search engine determines the data to be searched for as per the requirements of the user. Hence all application names in the catalog those have the keyword "App A" will show up. In addition, the user is also offered options to perform a faceted search on the "Geography" of the searched entity, where "Geography" is configured as a Facet. The break-up of the search results along the Geography will show up and the user will be able to drill down to any specific "Geography". Further, the extracted data is then customized (404) as per the priority specified by the user. As the user has specified High priority for 'applicationname' if the keyword appears in the attribute name that result is shown first in results. Also, the no of times the keyword appears also ensures that the result is shown on the top. The results are then displayed (405) to the user. In an embodiment, if the user wishes he may obtain the results in the format desired by him. This is served by a reporting engine that makes the reports of the search and sends it to the user in user desired format. In an embodiment, the results may be exported into an excel sheet, a word document or in a PDF format. The various actions in method 400 may be performed in the order presented, in a different order or simultaneously. Further, in some embodiments, some actions listed in FIG. 4 may be omitted.

Figure 5:
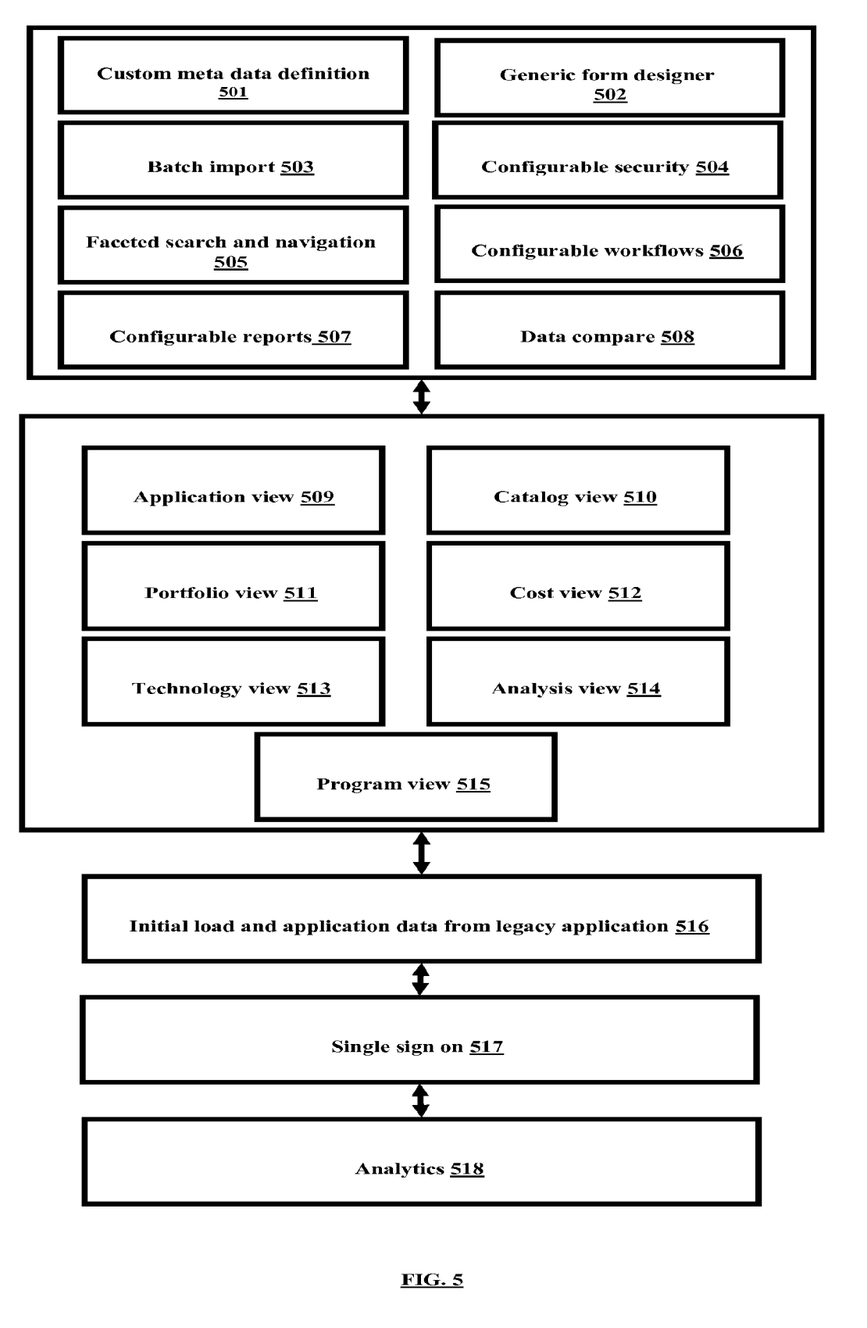
FIG. 5 is an example implementation of the catalog builder, according to embodiments as disclosed herein.

FIG. 5 is an example implementation of the catalog builder, according to embodiments as disclosed herein. The example herein illustrates an application catalog builder that is employed for inventory and portfolio management. The features provided by the application catalog are depicted in FIG. 5.

Custom Meta-Data Definition 501

The tool provides complete configurability by enabling users configure a custom entity, and its meta-data to create an on-line repository of the defined entity. Examples of entities could be Application, Project Portfolio, Process Maps, Best Practice, Case-Studies, Software/Hardware assets etc, which could be defined along with its associated meta-data Generic Form Designer 502

The tool provides a generic form designer features that enables the user to design a 'Submit' form to capture the real-time information of the entity.

Batch Import 503

The tool provides a Batch Import facility which enables the user to import the entity details existing in varied sources as a batch via excel sheets.

Configurable Security 504

Security in the tool is configurable by enabling one to define the 'Submit', 'Edit' and 'View' permissions for various roles.

Faceted Search and Navigation 505

The tool provides a Faceted Search and Navigation feature that enables one to quickly retrieve details from the repository. The faceting capability also helps in performing a clustering and segmentation analysis.

Configurable Workflow 506

The tool provides a configurable workflow definition capability to facilitate review/authorization processes around the stored data.

Configurable Reports 507

The tool enables various types of reports that can be configured to help in the analysis of the data.

Data Compare 508

The tool enables the data comparison to the lowest level aiding in better analysis. This tool in many cases has been configured as an Application Inventory/Cataloger by defining the 'Application' as the core-entity along with its meta-data.

Using the catalog builder's Attribute Management feature, it is possible to configure and manage the Views (Attribute Categories) and the Attributes with their values to be captured for the 600 odd applications globally.

The Views created were as follows:

Application View 509

This tool enables capture of application details like what the application does (description), the documentation details and the current status of the application (if it's active or retired).

Catalog View 510

This module captures which Service category and services under that service category this application addresses.

Portfolio View 511

This tool captures the details like what's the scope of the application (if it's an Global, regional or local), the region which drives it, the sub region, countries this is used in, the application support details like the vendor, their contract details, SLA's, the Business Functions the application supports, the End to End Processes the application addresses, the Application Service manager and the application owner (if it's IT, Business).

Cost View 512

This tool captures the various cost elements for the application.

Technology View 513

This tool captures which platform, application server, web server, which technologies, which Database and if the application is a client/server or desktop application.

Analysis View 514

This tool captures details which will help in facilitating the application portfolio analysis like the importance of the application to today's and tomorrow's business, the stability, criticality and the size of the application.

Program View 515

This tool captures details which will help in defining the rationalization and consolidation roadmap for application catalog like defining if the application is going to be a target architecture element or a replacement candidate, the replacement date if it is a replacement candidate and mapping each application to the initiatives for future execution roadmap.

Initial Load of Application Data from Legacy Application 516

An excel dump on the application data is received from the legacy tool. The data is scrubbed, massaged and mapped the data to the configured attribute and its values as requested by the user.

Using the Batch Import functionality in the application, 600 odd applications with over 50 attributes each are uploaded into the tool within an hour's time.

In an embodiment, this feature offers the exact error detail and points to the cell number in the uploaded excel sheet, which helps in quick correction if any issues in data validation before loading.

Single Sign On 517

The application is single sign on and enables features including testing and deployment and may be rolled out to 150 odd users globally with access to view, edit or submit applications. The design is such that any new user accessing the application will have a default View access only and then the Admin can change his access as required using the Manage Roles features in the application.

Analytics

Configurable reporting solution is provided with option to build reports. Reporting engine 205 enables the user to configure reporting solutions on top of the data existing in the repository with option to build standard types of reports—Bar Charts, Pie Charts, Stacked Pie Charts, Line Graphs. The reports may include charts built in with option to download to excel and PDF. The analytics helped in having a clear view of the application portfolio and allowed to slice and dice the information to help facilitate the Architects and the Service Managers take an informed decision in defining the Application and the overall Enterprise's roadmap. The comparison feature of n number of selected applications helps the service managers and Architects take a rational decision for an application.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

We claim:

1. A catalog builder system (100) for creating a customized catalog, the catalog builder system (100) comprising
   a central repository (105) containing a first set of data and
      a catalog configuration request sourced from a user (109), wherein the catalog configuration request comprises user's requirements for creating the customized catalog;
   a configuration console (107)
      configuring one or more attributes associated to the first set of data, wherein the one or more attributes comprises a mandatory key, a unique key, and a primary key, and wherein each attribute of the one or more attributes is configured in a manner such that each attribute is assigned a priority; and
      verifying the configuration of the one or more attributes based on pre-defined configuration specifications;
   a search engine (106) configured to perform a search in the first set of data by,
      a) receiving the search query from the user, wherein the search query comprises one or more keywords;
      b) sending the search query to a Solr search engine (106), wherein the Solr search engine (106) facilitates to perform the search based on the one or more keywords; and
      c) fetching a second set of data from the central repository (105), wherein the second set of data is a subset of the first set of data;
   the search engine (106) further configured to display the second set of data based on the priority assigned to each attribute associated to the second set of data;
   a faceted search module (102) configured to perform a faceted search on the second set of data based on a faceted search option configured to drill down search results pertaining to the second set of data and thereby displaying a third set of data to the user based upon the priority, wherein the third set of data is a subset of the second set of data; and
   a reporting and data compare module (104) configured to generate the customized catalog based upon the third set of data and the catalog configuration request.

2. The catalog builder system as in claim 1, further comprising a plurality of configuration tools configured to create the customized catalog based on the user's requirements and dynamically transforms the central repository into a modeled configured repository having plurality of behavioral characteristics specified by the user comprising a plurality of entities, the one or more attributes, search facilities, reporting, data format, and file format associated with the modeled configuration repository.

3. The catalog builder system as in claim 1, wherein the catalog builder system is configured to fetch the second set of data upon
   a) segmenting the first set of data into a plurality of parts of data based on the search query; and
   b) clustering the plurality of parts of data to derive the second set of data.

4. The catalog builder system as in claim 1, wherein the catalog builder system is configured to input configuration request for a batch wise processing of plurality of requests for data extraction and sending the configured entities to the user using a batch import facility.

5. The catalog builder system as in claim 1, wherein the configuration console (107) further comprises an integrated reporting engine (205) that is configured to dynamically configure plurality of reporting features comprising bar charts, pie charts, stacked pie charts, and line graphs associated with the data and generate reports on the catalog in at least one file format in accordance with user requirements.

6. The catalog builder system as in claim 1, wherein, the configuration console (107) enables the plurality of users (109) to configure at least one catalog application according to requirements for their applications through a user node and sending configured information by the configuration console to the central repository for storing configuration specifications.

7. The catalog builder system as in claim 1, wherein the configuration console (107) is configured to provide access authentication to the data on the central repository and to dynamically configure the plurality of entities, the one or more attributes, process flows and the faceted search option by the user through the configuration console (107).

8. The catalog builder system as in claim 1, wherein the configuration console (107) further facilitates to configure on the fly at least one entity of the plurality of entities, the one or more attributes, associated metadata, at least one key by employing configuration process.

9. The catalog builder system as in claim 1, wherein the faceted search module (102) is configured to extract a plurality of entities for search text associated with at least one data type configured in the central repository to facilitate a keyword based search with associated metadata, providing navigational efficiency.

10. The catalog builder system as in claim 1, wherein catalog administrators (108), the users (109) and analysts (110) are configured to remotely access the catalog builder by means of a plurality of communication devices including a user computer, laptop and a hand held devices, each device having a configuration console.

11. A method for creating a customized catalog, the method comprising:
sourcing, by a processor, a first set of data and a catalog configuration request contained in a central repository (105) from a user (109), wherein the catalog configuration request comprises user's requirements for creating the customized catalog;
configuring, by the processor, one or more attributes associated to the first set of data, wherein the one or more attributes comprises a mandatory key, a unique key, and a primary key, and wherein each attribute of the one or more attributes is configured in a manner such that each attribute is assigned a priority;
verifying, by the processor, the configuration of the one or more attributes based on pre-defined configuration specifications;
performing, by the processor, a search in the first set of data by,
   a) receiving the search query from the user, wherein the search query comprises one or more keywords;
   b) sending the search query to a Solr search engine (106), wherein the Solr search engine (106) facilitates to perform the search based on the one or more keywords; and
   c) fetching a second set of data from the central repository (105), wherein the second set of data is a subset of the first set of data;
displaying, by the processor, the second set of data based on the priority assigned to each attribute associated to the second set of data;
performing, by the processor, a faceted search on the second set of data based on a faceted search option configured to drill down search results pertaining to the second set of data and thereby displaying a third set of data to the user based upon the priority, wherein the third set of data is a subset of the second set of data; and
generating, by the processor, the customized catalog based upon the third set of data and the catalog configuration request.

12. The method as in claim 11, wherein the method further comprising clustering and segmentation of the contents of the central repository and further slicing and dicing of individual data for transforming the data therein into a new set of catalog.

* * * * *